United States Patent
Jarvelainen et al.

(10) Patent No.: US 10,218,271 B2
(45) Date of Patent: Feb. 26, 2019

(54) ELECTRIC POWER SYSTEM

(71) Applicant: Visedo Oy, Lappeenranta (FI)

(72) Inventors: Tero Jarvelainen, Lappeenranta (FI); Kimmo Rauma, Lappeenranta (FI)

(73) Assignee: DANFOSS MOBILE ELECTRIFICATION OY, Kaooeebrabta (FI)

( * ) Notice: Subject to any disclaimer, the term of this patent is extended or adjusted under 35 U.S.C. 154(b) by 56 days.

(21) Appl. No.: 15/425,096

(22) Filed: Feb. 6, 2017

(65) Prior Publication Data
US 2017/0229964 A1    Aug. 10, 2017

(30) Foreign Application Priority Data
Feb. 5, 2016 (EP) .................. 16154410

(51) Int. Cl.
  H02M 3/158 (2006.01)
  B60L 11/18 (2006.01)
  H02H 7/12 (2006.01)
  H02P 27/06 (2006.01)
  B60L 11/00 (2006.01)
  (Continued)

(52) U.S. Cl.
  CPC .......... *H02M 3/158* (2013.01); *B60L 11/005* (2013.01); *B60L 11/1803* (2013.01); *H02H 1/06* (2013.01); *H02H 3/087* (2013.01); *H02H 3/20* (2013.01); *H02H 7/12* (2013.01); *H02H 7/1213* (2013.01); *H02H 7/268* (2013.01); *H02P 27/06* (2013.01);
  (Continued)

(58) Field of Classification Search
  CPC .................................................. H02M 3/158
  See application file for complete search history.

(56) References Cited

U.S. PATENT DOCUMENTS

| | | | |
|---|---|---|---|
| 2012/0001479 A1* | 1/2012 | Harpin | B63H 21/17 307/9.1 |
| 2012/0065827 A1* | 3/2012 | Kimura | B60L 11/1811 701/22 |

(Continued)

FOREIGN PATENT DOCUMENTS

WO    2015/168830 A1    11/2015

OTHER PUBLICATIONS

European Search Report, dated Jul. 20, 2016, from corresponding European Application.

*Primary Examiner* — Daniel Kessie
(74) *Attorney, Agent, or Firm* — Young & Thompson

(57) ABSTRACT

An electric power system includes a direct voltage rail (101), battery elements (102-104) connected with supply-converters (105-107) to the direct voltage rail, and load-converters (111-113) for converting direct voltage of the direct voltage rail into voltages suitable for loads of the electric power system, where the supply-converters and the load-converters are connected with over-current protectors (108-110, 114-116) to the direct voltage rail. The electric power system further includes a capacitor system (117) connected to the direct voltage rail and capable of supplying fault current for switching an over-current protector into a non-conductive state in response to a fault causing a voltage drop at an electrical node connected to the direct voltage rail via the over-current protector. The capacitor system may include one or more high-capacitance electric double layer capacitors. The fault current available from the capacitor system enables a selective protection.

10 Claims, 2 Drawing Sheets

(51) Int. Cl.
*H02H 1/06* (2006.01)
*H02H 3/087* (2006.01)
*H02H 3/20* (2006.01)
*H02H 7/26* (2006.01)

(52) U.S. Cl.
CPC ....... *B60L 2200/32* (2013.01); *B60L 2210/40* (2013.01)

(56) References Cited

U.S. PATENT DOCUMENTS

| | | | | |
|---|---|---|---|---|
| 2012/0200966 | A1* | 8/2012 | Hill | G01R 31/024 361/62 |
| 2014/0361621 | A1* | 12/2014 | Lindtjorn | H02H 7/268 307/38 |
| 2015/0270704 | A1 | 9/2015 | Qi et al. | |

* cited by examiner

ELECTRIC POWER SYSTEM

FIELD OF THE DISCLOSURE

The disclosure relates to an electric power system that can be, for example but not necessarily, an electric power system of a ship.

BACKGROUND

In many cases, an electric power system comprises a direct voltage rail, one or more battery elements for supplying electric energy to the direct voltage rail, and one or more load-converters for converting the direct voltage of the direct voltage rail into voltages suitable for one or more loads of the electric power system. The electric power system can be for example an electric power system of a ship in which case the loads of the electric power system may comprise one or more propulsion motors, an alternating voltage network of the ship, and other loads such as e.g. one or more bow thruster motors. The motors are advantageously alternating current "AC" motors and the corresponding load-converters are inverters for converting the direct voltage of the direct voltage rail into alternating voltages suitable for the AC-motors.

In many cases it is advantageous that the direct voltage of the direct voltage rail is higher than the direct voltages of the battery elements. In these cases, each of the battery elements is typically connected with a voltage-increasing supply-converter to the direct voltage rail. The supply-converter comprises typically an inductor coil whose first pole is connected to the respective battery element, a controllable switch between the ground and the second pole of the inductor coil, and an unidirectionally conductive component, e.g. a diode, for providing a path for electric current from the inductor coil towards the direct voltage rail in response to a situation in which the controllable switch is in a non-conductive state.

In an electric power system of the kind described above, there is typically a need for a selective protection so that, in a case of a fault, a portion of the electric power system which is functionally separated from the rest of the electric power system is as small as possible. For example, in a case of fault in one of the load-converters, only the faulty load-converter is functionally separated from the rest of the electric power system. In order to implement the selective protection, each of the above-mentioned supply-converters is typically connected via a fuse or another over-current protector to the direct voltage rail. Correspondingly, each of the above-mentioned load-converters is connected via a fuse or another over-current protector to the direct voltage rail.

An inherent challenge related to the above-described approach is that, in many fault situations, the supply-converters of the kind described above may be incapable of supplying sufficient fault current within a sufficiently short time after the beginning of a fault situation. Therefore, the fault current through a fuse or another over-current protector may be insufficient to burn the fuse or to switch the other over-current protector into a non-conductive state sufficiently fast. Therefore, there is a risk that a faulty portion of the electric power system is not correctly separated from the rest of the electric power system. It is naturally possible to provide the supply-converters with additional means for supplying sufficient fault current from the battery elements within a sufficiently short time but this would make the supply-converters significantly more complex and less cost effective.

Publication WO2015168830 describes a method for protecting a direct-current "DC" electric power distribution system that includes one or more alternating current/direct current "AC/DC" converters and/or one more DC/DC converters, and one or more loads, connected by DC-buses. The method, which is carried out in response to a detection of a fault somewhere in the system, begins with limiting an output current of each of one or more of the converters so that each of these converters outputs a limited DC-current. After the current limitation of the one or more converters has taken place, one or more protection devices in the system are activated, where the activating at least partly depends on the limited DC-currents. The activation may comprise an automatic opening of one or more protection devices, wherein the opening of each protection device is based on a respective device current exceeding a respective threshold for a respective period of time. In this method, a correct operation of the protection devices is achieved so that the limited DC-currents are controlled so that the activation of the protection devices is successful. This approach, however, complicates the control of the converters.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new electric power system that can be, for example but not necessarily, an electric power system of a ship. An electric power system according to the invention comprises:
 a direct voltage rail,
 one or more battery elements,
 one or more supply-converters for transferring electric energy from the one or more battery elements to the direct voltage rail, each supply-converter being connected to one of the one or more battery elements,
 one or more load-converters for converting direct voltage of the direct voltage rail into voltages suitable for one or more loads of the electric power system,
 first over-current protectors connected between the direct voltage rail and each of the one or more supply-converters and between the direct voltage rail and each of the one or more load-converters, and
 a capacitor system connected to the direct voltage rail via a second over-current protector and comprising one or more capacitors, the capacitor system being capable of supplying fault current for switching one of the first over-current protectors into a non-conductive state in response to a fault causing a voltage drop at an electrical node connected to the direct voltage rail via the one of the first over-current protectors, a current limit of the second over-current protector being higher than a current limit of each of the first over-current protectors.

The capacitor system may comprise for example one or more electric double layer capacitors "EDLC" which may be also called "super capacitors". The electric energy stored by the capacitor system mitigates a voltage drop in the direct voltage rail during a fault situation, and the fault current available from the capacitor system enables a selective protection. The capacitor system can be either a centralized capacitor system which is connected to one point of the direct voltage rail or the capacitor system can be a distributed capacitor system comprising many capacitor elements connected to many points of the direct voltage rail. Each over-current protector can be for example a fuse or a relay switch responsive to current exceeding a pre-determined limit.

It is to be noted that an electric power system according to an exemplifying and non-limiting embodiment of the invention may comprise more than one direct voltage rail and more than one capacitor system connected to the direct voltage rails so that the direct voltage rails are interconnected with one or more over-current protectors and each direct voltage rail is connected to one of the capacitor systems.

In accordance with the invention, there is provided also a new ship that comprises an electric power system according to the invention. The loads of the electric power system of the ship may comprise for example one or more propulsion motors, an alternating voltage network of the ship, and/or other loads such as e.g. one or more bow thruster motors. The motors are advantageously alternating current "AC" motors and the corresponding load-converters are inverters for converting one or more direct voltages of one or more direct voltage rails of the electric power system into alternating voltages suitable for the AC-motors.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which:

FIG. 1b shows a schematic illustration of a main circuit of a supply-converter of the electric power system illustrated in FIG. 1a.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1A:
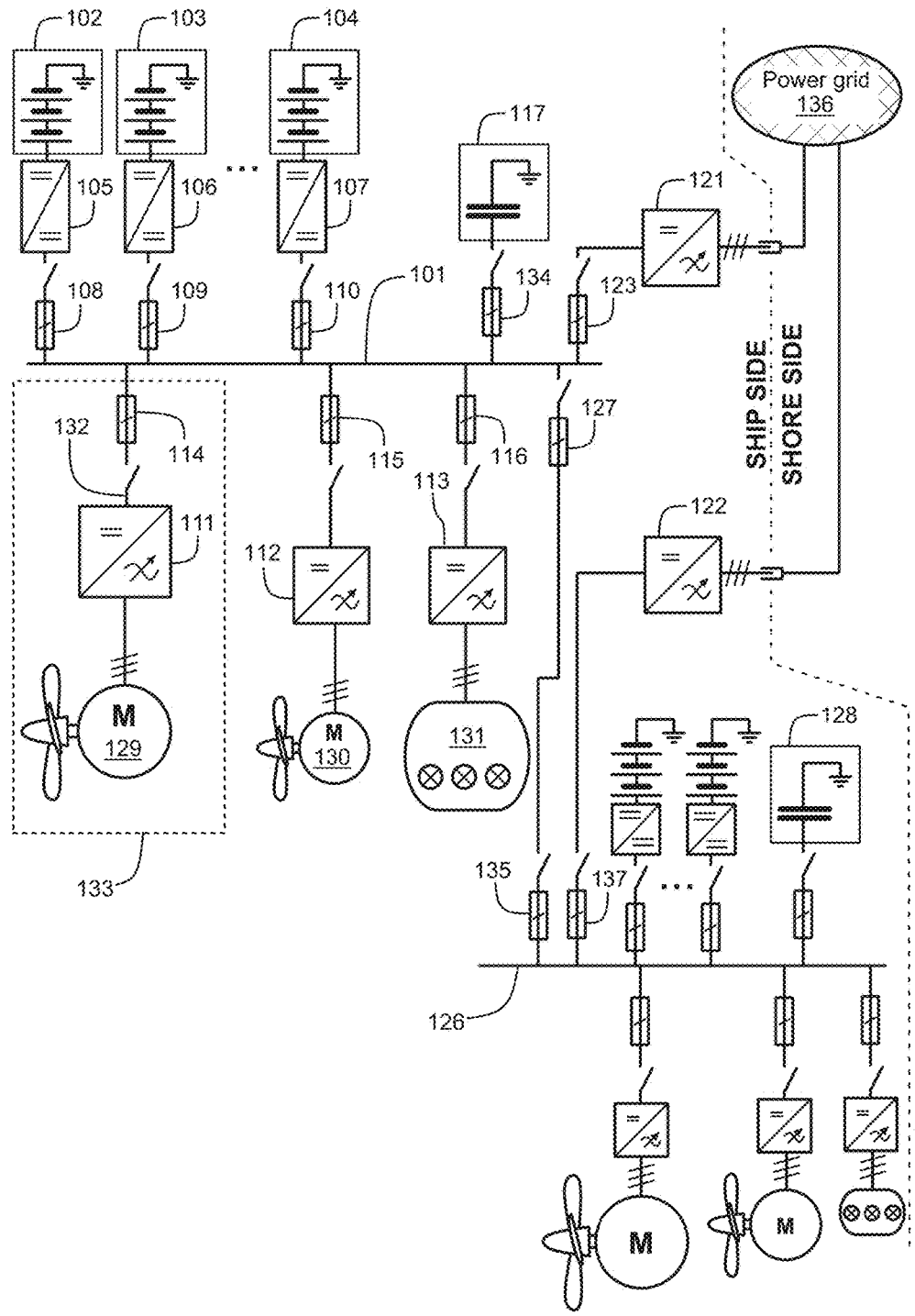
FIG. 1a shows a schematic illustration of an electric power system according to an exemplifying and non-limiting embodiment of the invention.

FIG. 1a shows a schematic illustration of an electric power system according to an exemplifying and non-limiting embodiment of the invention. In this exemplifying case, the electric power system is an electric power system of a ship. The electric power system comprises a direct voltage rail 101, battery elements, and supply-converters for transferring electric energy from the battery elements to the direct voltage rail. In FIG. 1a, three of the battery elements are denoted with figure references 102, 103, and 104, and three of the supply-converters are denoted with figure references 105, 106, and 107. The electric power system comprises load-converters for converting the direct voltage of the direct voltage rail 101 into voltages suitable for loads of the electric power system. In FIG. 1a, three of the load-converters are denoted with figure references 111, 112, and 113. In the exemplifying case illustrated in FIG. 1a, the loads of the electric power system comprise a propulsion system, bow thruster motors, and an alternating voltage network of the ship. In FIG. 1a, one of the electric motors of the propulsion system is denoted with a figure reference 129, one of the bow thruster motors is denoted with a figure reference 130, and a part of the alternating voltage network of the ship is denoted with a figure reference 131. In the exemplifying case illustrated in FIG. 1a, the load-converters comprise inverters for converting the direct voltage of the direct voltage rail into alternating voltages suitable for the loads of the electric power system.

The electric power system comprises over-current protectors connected between the direct voltage rail 101 and each of the one or more supply-converters and other over-current protectors connected between the direct voltage rail 101 and each of the one or more load-converters. In FIG. 1a, three of the over-current protectors connected between the direct voltage rail 101 and the supply-converters are denoted with figure references 108, 109, and 110, and three of the over-current protectors connected between the direct voltage rail 101 and the load-converters are denoted with figure references 114, 115, and 116. Each over-current protector can be for example a fuse or a relay switch responsive to current exceeding a predetermined limit.

The electric power system further comprises a capacitor system 117 connected to the direct voltage rail 101. The capacitor system 117 may comprise for example one or more high-capacitance electric double layer capacitors "EDLC" which are also called "super capacitors". The capacitance of the capacitor system 117 is advantageously at least 0.1 F, more advantageously at least 1 F, and yet more advantageously at least 10 F. The capacitor system 117 is capable of supplying fault current that is sufficient to switch an appropriate one of the above-mentioned over-current protectors into a non-conductive state in response to a fault causing a voltage drop at an electrical node connected to the direct voltage rail via the one of the over-current protectors. For example, if there is a fault in the load-converter 111 and/or in the electric motor 129 such that the voltage of an electric node 132 drops, the capacitor system 117 supplies fault current through the over-current protector 114 so that the over-current protector 114 is switched into the non-conductive state and, as a corollary, a part 133 of the electric power system is separated from the rest of the electric power system. In the exemplifying electric power system illustrated in FIG. 1a, the capacitor system 117 is connected to the direct voltage rail 101 via an over-current protector 134. The current limit of the over-current protector 134 is sufficiently higher than the current limit of each of the over-current protectors 108-110 and 114-116 in order to achieve a selective protection.

The exemplifying electric power system illustrated in FIG. 1a comprises another direct voltage rail 126 so that the direct voltage rails 101 and 126 of the electric power system are connected to each other via over-current protectors 127 and 135. The portions of the electric power system connected to different ones of the direct voltage rails are advantageously operable independently of each other in order to improve the operational reliability of the electric power system. The electric power system comprises another capacitor system 128 connected to the direct voltage rail 127 and capable of supplying fault current in the same way as the above-mentioned capacitor system 117.

The exemplifying electric power system illustrated in FIG. 1a comprises charging converters 121 and 122 for receiving electric energy from an external power network 136 and for supplying the electric energy to the direct voltage rails 101 and 126 via over-current protectors 123 and 137. The electric power system comprises means for charging the battery elements with the electric energy received from the power network 136. The supply-converters can be provided with components and control systems for enabling the supply-converters to transfer electric energy from the direct voltage rails to the battery elements. It is, however, also possible that the electric power system comprises separate converters for charging the battery elements.

Figure 1B:
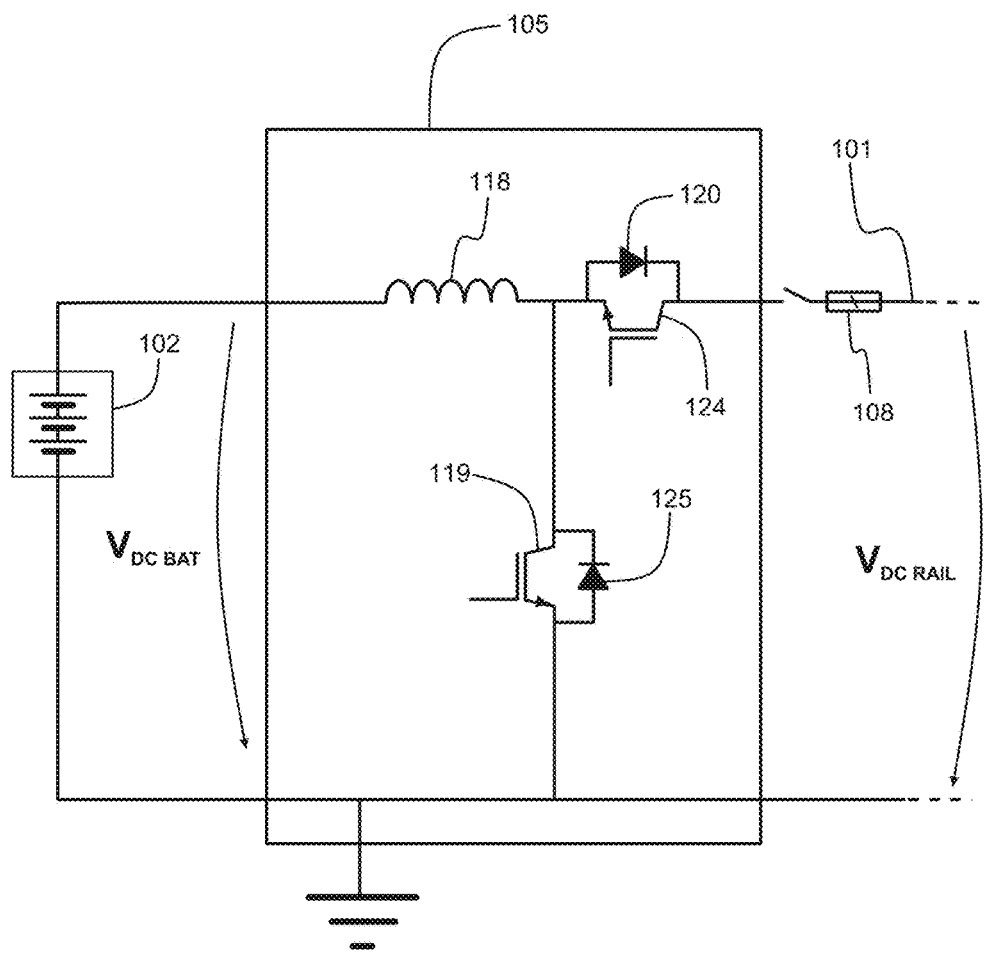

FIG. 1b illustrates the main circuit of the supply-converter 105 for transferring electric energy from the battery element 102 to the direct voltage rail 101. The other supply-converters can be similar to the supply-converter 105. The main circuit of the supply-converter 105 comprises an inductor coil 118 whose first pole is connected to the battery element 102. The main circuit comprises a first controllable switch 119 between the ground and the second pole of the inductor coil 118. The first controllable switch 119 can be for example an insulated gate bipolar transistor "IGBT", a gate turn-off thyristor "GTO", a bipolar transistor, or a field-effect transistor "FET". The main circuit of the supply-converter 105 comprises a first unidirectionally conductive component 120 for providing a path for electric current from the inductor coil 118 towards the direct voltage rail 101 in response to a situation in which the first controllable switch 119 is in a non-conductive state. The first unidirectionally conductive component 120 can be for example a diode. The supply-converter 105 is a voltage-increasing converter, i.e. a boost-converter, capable of transferring electric energy from the battery element 102 to the direct voltage rail 101 in a controlled way when the voltage $V_{DC\_BAT}$ of the battery element is smaller than the voltage $V_{DC\_RAIL}$ of the direct voltage rail 101.

In the exemplifying case illustrated in FIG. 1b, the supply-converter 105 further comprises components for enabling the supply-converter to transfer electric energy from the direct voltage rail 101 to the battery element 102 so as to charge the battery element 102. The main circuit of the supply-converter 105 comprises a second controllable switch 124 for conducting electric current arriving from the direct voltage rail 110 to the second pole of the inductor coil 118. The second controllable switch 124 can be for example an insulated gate bipolar transistor "IGBT", a gate turn-off thyristor "GTO", a bipolar transistor, or a field-effect transistor "FET". The main circuit of the supply-converter 105 comprises a second unidirectionally conductive component 125 for providing a path for electric current from the ground to the second pole of the inductor coil 118 in response to a situation in which the second controllable switch 124 is in a non-conductive state. The second unidirectionally conductive component 125 can be for example a diode. With the aid of the inductor coil 118, the second controllable switch 124, and the second unidirectionally conductive component 125, the supply-converter 105 is capable of charging the battery element 102 by transferring electric energy from the direct voltage rail 101 to the battery element 102 in a controlled way when the voltage $V_{DC\_BAT}$ of the battery element is smaller than the voltage $V_{DC\_RAIL}$ of the direct voltage rail 101. In an exemplifying case where the first and second controllable switches 119 and 124 are IGBTs or metal oxide semiconductor field effect transistors "MOSFET", the first and second unidirectionally conductive components 120 and 125 can be body diodes of the IGBTs or the MOSFETs.

Each of the supply-converters and each of the load-converters of the electric power system may comprise a controller for controlling the operation of the converter under consideration. It is also possible that a single controller is configured to control many converters. A controller can be implemented with one or more processor circuits each of which can be a programmable processor circuit provided with appropriate software, a dedicated hardware processor such as for example an application specific integrated circuit "ASIC", or a configurable hardware processor such as for example a field programmable gate array "FPGA". Furthermore, each controller may comprise one or more memory circuits. The controllers are not shown in FIGS. 1a and 1b.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. An electric power system comprising:
   a direct voltage rail;
   one or more battery elements;
   one or more supply-converters configured to transfer electric energy from the one or more battery elements to the direct voltage rail, each supply-converter being connected to one of the one or more battery elements;
   one or more load-converters configured to convert direct voltage of the direct voltage rail into voltages suitable for one or more loads of the electric power system;
   first over-current protectors connected between the direct voltage rail and each of the one or more supply-converters and between the direct voltage rail and each of the one or more load-converters; and
   a capacitor system connected to the direct voltage rail via a second over-current protector and comprising one or more capacitors, the capacitor system being configured to supply fault current for switching one of the first over-current protectors into a non-conductive state in response to a fault causing a voltage drop at an electrical node connected to the direct voltage rail via the one of the first over-current protectors,
   wherein a current limit of the second over-current protector is higher than a current limit of each of the first over-current protectors.

2. The electric power system according to claim 1, wherein the one or more load-converters comprise one or more inverters configured to convert the direct voltage of the direct voltage rail into alternating voltages suitable for one or more of the loads of the electric power system.

3. The electric power system according to claim 1, wherein each supply-converter comprises:
   an inductor coil whose first pole is connected to the corresponding one of the battery elements,
   a first controllable switch between a ground and a second pole of the inductor coil, and
   a first unidirectionally conductive component for providing a path for electric current from the inductor coil towards the direct voltage rail in response to a situation in which the first controllable switch is in a non-conductive state.

4. The electric power system according to claim 3, wherein each of the one or more supply-converters further comprises the following components for enabling the supply-converter to transfer electric energy from the direct voltage rail to the corresponding one of the battery elements:
   a second controllable switch configured to conduct electric current arriving from the direct voltage rail to the second pole of the inductor coil, and
   a second unidirectionally conductive component configured to provide a path for electric current from the ground to the second pole of the inductor coil in response to a situation in which the second controllable switch is in a non-conductive state.

5. The electric power system according to claim 1, wherein the electric power system comprises a charging converter configured to receive electric energy from an external power network and configured to supply the electric energy to the direct voltage rail via a third over-current protector.

6. The electric power system according to claim 1, wherein the electric power system comprises at least one other direct voltage rail so that the direct voltage rails of the electric power system are connected to each other via one or more over-current fourth protectors.

7. The electric power system according to claim 6, wherein the electric power system comprises at least one other capacitor system comprising one or more capacitors and connected to the at least one other direct voltage rail.

8. The electric power system according to claim 1, wherein the capacitor system comprises one or more electric double layer capacitors.

9. The electric power system according to claim 1, wherein at least one of the first and second over-current protectors is a fuse.

10. A ship comprising an electric power system comprising:
   a direct voltage rail;
   one or more battery elements;
   one or more supply-converters configured to transfer electric energy from the one or more battery elements to the direct voltage rail, each supply-converter being connected to one of the one or more battery elements;
   one or more load-converters configured to convert direct voltage of the direct voltage rail into voltages suitable for one or more loads of the electric power system;
   first over-current protectors connected between the direct voltage rail and each of the one or more supply-converters and between the direct voltage rail and each of the one or more load-converters; and
   a capacitor system connected to the direct voltage rail via a second over-current protector and comprising one or more capacitors, the capacitor system being configured to supply fault current configured to switch one of the first over-current protectors into a non-conductive state in response to a fault causing a voltage drop at an electrical node connected to the direct voltage rail via the one of the first over-current protectors,
   wherein a current limit of the second over-current protector is higher than a current limit of each of the first over-current protectors.

* * * * *